(12) United States Patent
Gregorius et al.

(10) Patent No.: US 7,683,146 B2
(45) Date of Patent: Mar. 23, 2010

(54) SUPPORTED METAL ALKYL COMPOUND AND PROCESS FOR THE POLYMERIZATION OF OLEFINS IN ITS PRESENCE

(75) Inventors: Heike Gregorius, Koblenz (DE); Maria Silvia Tonti, Ferrara (IT); Bernd Bachmann, Gross-Gerau (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/225,970

(22) PCT Filed: Apr. 23, 2007

(86) PCT No.: PCT/EP2007/003518

§ 371 (c)(1),
(2), (4) Date: Oct. 3, 2008

(87) PCT Pub. No.: WO2007/124877

PCT Pub. Date: Nov. 8, 2007

(65) Prior Publication Data

US 2009/0124770 A1      May 14, 2009

Related U.S. Application Data

(60) Provisional application No. 60/810,985, filed on Jun. 5, 2006.

(30) Foreign Application Priority Data

Apr. 28, 2006   (DE)   ................ 10 2006 020 486

(51) Int. Cl.
*C08F 4/44*   (2006.01)
(52) U.S. Cl. .................................... 526/127
(58) Field of Classification Search ................ 526/127
See application file for complete search history.

(56) References Cited

U.S. PATENT DOCUMENTS

| 3,242,150 A | 3/1966 | Scoggin |
| 3,248,179 A | 4/1966 | Norwood |
| 4,970,279 A * | 11/1990 | Bailly et al. ................ 526/63 |
| 5,057,475 A | 10/1991 | Canich et al. |
| 5,391,790 A | 2/1995 | Rohrmann et al. |
| 5,466,649 A | 11/1995 | Jejelowo |
| 5,534,474 A | 7/1996 | Becker et al. |
| 5,614,455 A | 3/1997 | Herrmann et al. |
| 5,698,642 A | 12/1997 | Govoni et al. |
| 5,831,105 A | 11/1998 | Aulbach et al. |
| 6,689,845 B1 | 2/2004 | Govoni et al. |
| 7,053,160 B1 | 5/2006 | Bingel et al. |
| 7,141,637 B2 | 11/2006 | Elder et al. |
| 7,342,078 B2 | 3/2008 | Schottek et al. |

FOREIGN PATENT DOCUMENTS

| EP | 0567952 | * | 4/1993 |
| EP | 0 560 128 A2 | | 9/1993 |
| EP | 0 792 297 B1 | | 11/1995 |
| WO | WO 2005/039763 A1 | | 5/2005 |

* cited by examiner

*Primary Examiner*—Ling-Siu Choi
*Assistant Examiner*—Sonya Wright
(74) *Attorney, Agent, or Firm*—William R. Reid; Jonathan L. Schuchardt

(57) ABSTRACT

The present invention relates to pulverulent solids obtainable by reaction of a metal alkyl compound of a divalent or higher-valent metal and a finely divided support which on its surface bears functional groups which can form a chemical bond between the metal atom of the metal alkyl compound and the surface of the support, wherein the particles of the finely divided support have particle diameters of less than 1000 nm and less than 5% by weight of the metal alkyl compound is extractable in a single extraction of the pulverulent solid with 20 ml of heptane per gram of solid at 50° C. In addition, the invention relates to a process for preparing the pulverulent solids, a catalyst composition for the polymerization of olefins which comprises the pulverulent solids and polymerization processes using the catalyst composition.

10 Claims, No Drawings

SUPPORTED METAL ALKYL COMPOUND AND PROCESS FOR THE POLYMERIZATION OF OLEFINS IN ITS PRESENCE

CROSS-REFERENCE TO RELATED APPLICATIONS

This application is a national phase filing under 35 U.S.C. § 371 of International Application PCT/EP2007/003518, filed 23 Apr. 2007, claiming priority to German Patent Application 10 2006 020 486.7 filed 28 Apr. 2006 and provisional U.S. Appl. No. 60/810,985 filed 5 Jun. 2006; the disclosures of International Application PCT/EP2007/003518, German Pat. Appl. 10 2006 020 486.7, and U.S. Appl. No. 60/810,985, each as filed, are incorporated herein by reference.

The present invention relates to pulverulent solids obtainable by reacting a metal alkyl compound of a divalent or higher-valent metal and a finely divided support which on its surface bears functional groups which can form a chemical bond between the metal atom of the metal alkyl compound and the surface of the support. Furthermore, the present invention relates to a process for preparing the pulverulent solids, a catalyst composition for the polymerization of olefins which comprises the pulverulent solids and a polymerization process using the catalyst composition.

Transition metal catalysts such as Ziegler-Natta, Phillips or single-site catalysts are frequently used for the polymerization of olefins such as ethylene or propylene. These are generally sensitive toward impurities in the starting materials, for example oxygen, water or alcohols. Such impurities act as catalyst poisons and not only have a considerable adverse effect on the productivity of the catalysts but frequently also on the product properties of the (co)polymers prepared. To minimize the effects of the impurities, it is widespread practice to add dissolved or liquid metal alkyls and in particular aluminumalkyls as cocatalysts in the polymerization of olefins in the presence of transition metal catalysts. These added alkyls can react in a targeted manner with the impurities comprised in the starting materials before the impurities can interact with the catalysts. However, it has been found that under some conditions dissolved or liquid metal alkyls can result in considerable disadvantages, since the dissolved or liquid metal alkyls naturally also interact with the catalysts. For example, metal alkyls cause a reduction in the mean molar mass of the polymers obtained in the polymerization using Phillips catalysts. Furthermore, addition of metal alkyls in the polymerization can lead to formation of agglomerates or deposits in the reactor. For this reason, various possible methods of removing the impurities by reaction possible in another way than by addition of dissolved or liquid metal alkyls have been proposed.

In particular for the polymerization using Phillips catalysts, EP-A 560 128 discloses solids in which divalent or higher-valent metal alkyls are chemically bound to a finely divided support and which are suitable for the purification of liquid and gaseous substances and of chemical reactors. In general, supports having a mean particle size of from 1 μm to 1 mm are used here.

WO 2005/039763 likewise describes supported metal alkyl compounds which display excellent powder flow and in which the proportion by weight of metal alkyl compound is at least 5% by weight and which are used for purification purposes. These solids comprise metal alkyls which are chemically fixed on the supports and also physically bound metal alkyls.

WO 95/10542 describes metallocene catalyst systems in which supported metallocene compounds are used in combination with supported cocatalysts or activators, e.g. aluminum alkyl compounds supported on silica gel.

EP-A 567 952 discloses supported polymerization catalysts comprising the reaction product of a supported organoaluminum compound and a metallocene. To prepare the supported organoaluminum compound, the reaction product of a silica gel or a pyrogenic silica with an aluminum alkyl compound is firstly formed and this is subsequently hydrolyzed by addition of water. However, according to the teachings of EP-A 567 952, less than 100 g of support material are used per mole of aluminum alkyl.

A disadvantage of the use of such solids in the polymerization of olefins in the presence of transition metal catalysts is the fact that these solids remain in the polymers obtained. In the production of films from such products, relatively large particles can result in formation of specks which adversely affect the optical quality of the films. The production of fiber products is also problematical. Here, a melt filtration is usually carried out prior to spinning. If the polymers comprise excessively large amounts of particulate residues, an overpressure can build up at the sieve plate. This leads to considerable process engineering difficulties such as shortened filter operating times.

It was therefore an object of the present invention to overcome the disadvantages of the prior art and to provide a possible way of removing the impurities present in the starting materials in the polymerization of olefins in the presence of transition metal catalysts by reaction in a targeted manner without formation of agglomerates or deposits in the reactor occurring and without the properties of the products produced in this way being greatly impaired.

It has now surprisingly been found that the use of metal alkyls immobilized on particulate supports having particle diameters of less than 1000 nm makes it possible to carry out a polymerization at high catalyst productivity and without formation of agglomerates or deposits in the reactor and without a deterioration in the film properties or a decrease in the suitability for producing fiber products being associated therewith.

The present invention accordingly provides pulverulent solids obtainable by reaction of a metal alkyl compound of a divalent or higher-valent metal and a finely divided support which on its surface bears functional groups which can form a chemical bond between the metal atom of the metal alkyl compound and the surface of the support, wherein the particles of the finely divided support have particle diameters of less than 1000 nm and less than 5% by weight of the metal alkyl compound is extractable in a single extraction of the pulverulent solid with 20 ml of heptane per gram of solid at 50° C. The invention further provides a process for preparing the pulverulent solids, a catalyst composition for the polymerization of olefins which comprises the pulverulent solids and a polymerization process using the catalyst composition.

An important starting compound for the preparation of the solids of the invention is a metal alkyl compound of a divalent or higher-valent metal. All metal alkyl compounds of divalent, trivalent, tetravalent or pentavalent metals but in particular the alkyls of divalent, trivalent or tetravalent metals are suitable. Examples of well-suited metal alkyls are the alkyl compounds of beryllium, magnesium, calcium, strontium, barium, zinc, boron, aluminum, gallium, indium, thallium, tin and lead. Among these, the alkyl compounds of boron, aluminum and zinc are particularly advantageous and are therefore particularly preferably used. Of these, particular mention may in turn be made of the alkyl compounds of aluminum which offer very particular advantages for the preparation of the solids of the invention and are therefore very particularly preferably employed.

In general, the alkyl groups of the metal alkyls have from 1 to 20 carbon atoms, with the alkyl groups also being able to be substituted as long as the substituent is compatible with the support and the intended use. Here, alkyl groups having from 2 to 8 carbon atoms, e.g. ethyl, n-propyl, isopropyl, n-butyl, isobutyl, n-pentyl, n-hexyl, heptyl, octyl and 2-methylhexyl and also cyclohexyl or methylcyclohexyl, are very particularly advantageous and are therefore very particularly preferably employed. Apart from fully alkylated metal alkyl compounds, it is also possible to use partially alkylated metal alkyl compounds, with possible further substituents being, for example, halogens, in particular chlorine or iodine, hydrides or alkoxy groups.

Examples of metal alkyls which can preferably be used are trimethylaluminum, triethylaluminum, tripropylaluminum, tri-n-butylaluminum, triisobutylaluminum, trihexylaluminum, trioctylaluminum, tridodecylaluminum diethylaluminum chloride, diethylaluminium hydride, ethylaluminum sesquichloride, ethylaluminum dichloride, diisobutylaluminum chloride, isobutylaluminum dichloride, diethylaluminum iodide, dipropylaluminum chloride, diisobutylaluminum hydride, diethylaluminum ethoxide, dimethylaluminum chloride, methylaluminum sesquichloride, diethylzinc, triethyl boron and butyloctylmagnesium and also partially hydrolyzed metal alkyls such as methylaluminoxane (MAO) or isobutylaluminoxane (IBAO). Particular preference is given to triethylaluminum, triisobutylaluminum, trihexylaluminum or trioctylaluminum, in particular triethylaluminum or triisobutylaluminum. The metal alkyls are compounds which are known per se and are commercially available.

The second important starting material for preparing the solids of the invention are particulate supports which have particle diameters of less than 1000 nm and on their surface bear functional groups which can form a chemical bond between the metal atom of the metal alkyl compound and the surface of the support.

Suitable support materials are, for example, precipitated silicas or pyrogenic silicas, with pyrogenic silicas being preferred. Pyrogenic silicas are generally prepared by flame hydrolysis in which silicon tetrachloride is usually decomposed in a hydrogen/oxygen flame. Pyrogenic silicas are commercially available and are offered, for example, by Degussa AG under the name Aerosil® or by Cabot Corp. under the name CAB-O-SIL®.

The supports used according to the invention are composed of particles having particle diameters of less than 1000 nm, preferably less than 500 nm, particularly preferably less than 200 nm and in particular less than 100 nm. The maximum particle diameter of the support materials used is usually determined by transmission electron microscopy.

The support particles used according to the invention are generally nonporous and thus generally also have only an external surface. They are usually not present in isolated form but instead form agglomerates in the form of loose networks in which the particles are held together by weak physical interactions. These aggregates can easily be broken up again to give the primary particles by means of low mechanical stress.

The support materials can be subjected to a thermal treatment, e.g. to remove adsorbed water. Such a drying treatment is generally carried out at temperatures in the range from 80 to 300° C., preferably from 100 to 200° C., with drying preferably being carried out under reduced pressure and/or in a stream of inert gas, for example nitrogen or argon.

The water which is physisorbed on the support material can also be removed by azeotropic distillation with a solvent which forms an azeotrope with water and does not react with the metal alkyl compound. Preference is for this purpose given to aliphatic or aromatic hydrocarbons and in particular toluene. To carry out drying, the support is usually suspended in the solvent, the suspension is subsequently heated to boiling and the water is then removed as azeotrope with the solvent. The removal of the water physisorbed on the support material is preferably carried out by azeotropic distillation.

The solids of the invention are usually prepared by firstly drying the support to a water content below 3% by weight, preferably below 2% by weight and in particular below 1% by weight. In this context, the water content is the total content of physisorbed water, which can, for example, be determined by thermogravimetry. The support which has been pretreated in this way is then brought into contact with the metal alkyl compound in an aliphatic or aromatic solvent, the suspension medium is separated off by filtration and the solid is washed one or more times with an aliphatic or aromatic solvent to remove metal alkyl compound which is not chemically bound. Drying under reduced pressure gives a finely divided solid. However, the supported alkyl compound can also be resuspended in an aliphatic or aromatic solvent after the last washing step or be processed to give an oil/grease paste. The production of such oil/grease pastes is preferably carried out at temperatures of not more than 60° C. and in particular at temperatures of not more than 25° C.

To determine the amount of metal alkyl compound which can be extracted from the solids of the invention, the solid which has been treated with the metal alkyl compound is usually suspended in at least 20 ml of heptane per gram of solid and the suspension is stirred at 40° C. for two hours. The solid is subsequently separated from the suspension medium by filtration and dried under reduced pressure. The extractable amount of metal alkyl compound can then be determined by comparison of the elemental analyses of the solid before and after extraction or by measurement of the metal content of the filtrate. The determination of the extractable amount of metal alkyl compound is preferably carried out by measurement of the metal content of the filtrate.

The solids of the invention generally have a content of metal originating from the metal alkyl compound in the range from 0.5 to 20% by weight, preferably from 2% to 15% by weight and in particular from 3% to 5% by weight. When partially hydrolyzed metal alkyls are used, this metal content is preferably in the range from 10 to 20% by weight. When unhydrolyzed, fully or partially alkylated actual metal alkyls are used, it is preferably in the range from 0.5 to 7% by weight and in particular from 2 to 5% by weight.

The pulverulent solids are obtained essentially from the two abovementioned components metal alkyl compound and support. However, further components can also be added in small amounts. Such additional components can be additives or auxiliaries of any type, for example antistatics.

The present invention further provides catalyst compositions for the polymerization of olefins which comprise the above-described pulverulent solids together with at least one compound comprising a transition metal. Possible compounds comprising a transition metal are all compounds which catalyze the polymerization of olefins, e.g. Phillips catalysts, Ziegler-Natta catalysts or transition metal compounds such as metallocene compounds which act as polymerization-components of unsupported or supported single-site catalyst systems. Preference is given to Phillips catalysts or transition metal compounds acting as polymerization-active components of single-site catalyst systems, particularly preferably metallocene compounds.

Suitable components of the catalyst compositions of the invention are, for example, Ziegler-Natta catalysts. Ziegler-Natta catalysts generally comprise a titanium- or vanadium-comprising solid component which is prepared using titanium or vanadium compounds and frequently also finely divided inorganic or polymeric supports, compounds of magnesium, halogen compounds and electron donor compounds. For the present purposes, Ziegler-Natta catalysts include catalysts which are referred to as Ziegler catalysts in the literature.

Further suitable components of the catalyst compositions of the invention are Phillips catalysts. Phillips catalysts are usually prepared by applying a chromium compound to an inorganic support and subsequently calcining it at temperatures of from 350 to 950° C., resulting in chromium present in valences lower than six being converted into the hexavalent state. Apart from chromium, further elements such as Mg, Ca, B, Al, P, Ti, V, Zr and/or Zn can also be applied to the support or the constituents of the support. Particular preference is given to using Ti, Zr or Zn. It may be emphasized that combinations of the abovementioned elements are also possible according to the invention. The catalyst precursor can also be doped with fluoride before or during the calcinations. As supports for Phillips catalysts, which are also known to those skilled in the art, mention may be made of aluminum oxide, silicon dioxide (silica gel), titanium dioxide, zirconium dioxide or their mixed oxides or cogels or aluminum phosphate. Further suitable support materials can be obtained by modification of the pore surface, e.g. by means of compounds of the elements boron, aluminum, silicon or phosphorus. Particular preference is given to using a silica gel or a silica cogel with oxides of Mg, Ca, B, Al, P, Ti, V, Zr and/or Zn, in particular Ti, Zr or Zn. Preference is given to spherical or granular silica gels, with the former also being able to be spray dried. The activated chromium catalysts can subsequently be prepolymerized or prereduced. The prereduction is usually carried out using CO or else using hydrogen in the activator at temperatures of from 250 to 500° C., preferably from 300 to 400° C.

Particularly suitable transition metal compounds which are possible as components of the catalyst compositions of the invention are those which act as polymerization-active component of single-site catalyst systems. These are all compounds of the transition metals of groups 3 to 12 of the Periodic Table or the lanthanides which comprise organic groups and after reaction with cocatalysts and, if appropriate, organometallic compounds form catalysts which are active in olefin polymerization. These are usually compounds in which at least one monodentate or polydentate ligand is bound via a sigma or pi bond to the central atom. Possible ligands include both those which comprise cyclopentadienyl radicals and those which are free of cyclopentadienyl radicals. Chem. Rev. 2000, Vol. 100, No. 4, describes many such transition metal compounds which are suitable for olefin polymerization. Furthermore, multinuclear cyclopentadienyl complexes are also suitable for olefin polymerization.

Suitable polymerization-active components of single-site catalyst systems are, in particular, transition metal compounds having at least one cyclopentadienyl-type ligand, with those having two cyclopentadienyl-type ligands generally being referred to as metallocene complexes.

For the purposes of the present invention, particular preference is given to catalyst compositions comprising single-site catalyst systems based on metallocene compounds of the general formula (I),

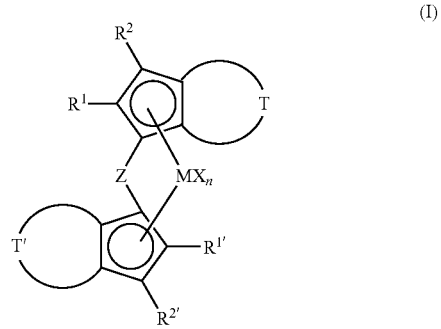

where
R$^1$, R$^{1'}$ are identical or different and are each an organic radical having from 1 to 40 carbon atoms,
R$^2$, R$^{2'}$ are identical or different and are each hydrogen or an organic radical having from 1 to 40 carbon atoms,
T, T' are identical or different and are each a divalent organic group which has from 1 to 40 carbon atoms and together with the cyclopentadienyl ring forms at least one further saturated or unsaturated, substituted or unsubstituted ring system having a ring size of from 5 to 12 atoms, with T and T' within the ring system fused to the cyclopentadienyl ring being able to comprise the heteroatoms Si, Ge, N, P, As, Sb, O, S, Se or Te,
Z is a bridge between the two substituted cyclopentadienyl ligands which consists of a divalent atom or a divalent group,
M is an element of group 3, 4, 5 or 6 of the Periodic Table of the Elements or the lanthanides,
the radicals X are identical or different and are each an organic or inorganic radical, with two radicals X also being able to be joined to one another, and
n is 0, 1, 2 or 3.

The radicals R$^1$ and R$^{1'}$ are identical or different, preferably identical, and are each hydrogen or an organic radical having from 1 to 40 carbon atoms, for example C$_1$-C$_{40}$-alkyl, C$_1$-C$_{10}$-fluoroalkyl, C$_2$-C$_{40}$-alkenyl, C$_6$-C$_{40}$-aryl, C$_6$-C$_{10}$-fluoroaryl, arylalkyl, arylalkenyl or alkylaryl having from 1 to 10, preferably from 1 to 4, carbon atoms in the alkyl radical and from 6 to 22, preferably from 6 to 10, carbon atoms in the aryl radical, a saturated heterocycle having from 2 to 40 carbon atoms or a C$_2$-C$_{40}$-heteroaromatic radical having at least one heteroatom selected from the group consisting of the elements O, N, S, P and Se, in particular O, N and S, with the heteroaromatic radical being able to be substituted by further radicals R$^3$, where R$^3$ is an organic radical having from 1 to 20 carbon atoms, for example C$_1$-C$_{10}$-, preferably C$_1$-C$_4$-alkyl, C$_6$-C$_{15}$-, preferably C$_6$-C$_{10}$-aryl, alkylaryl, arylalkyl, fluoroalkyl or fluoroaryl each having from 1 to 10, preferably from 1 to 4, carbon atoms in the alkyl radical and from 6 to 18, preferably from 6 to 10, carbon atoms in the aryl radical, and a plurality of radicals R$^3$ can be identical or different.

Preference is given to R$^1$ and R$^{1'}$ being identical or different, preferably identical, and each being C$_1$-C$_{10}$-alkyl such as methyl, ethyl, n-propyl, isopropyl, n-butyl, i-butyl, s-butyl, t-butyl, n-pentyl, cyclopentyl, n-hexyl, cyclohexyl, n-heptyl or n-octyl, preferably methyl, ethyl or isopropyl, in particular methyl.

The radicals R$^2$ and R$^{2'}$ are identical or different, preferably identical, and are each hydrogen or an organic radical having from 1 to 40 carbon atoms, for example C$_1$-C$_{40}$-alkyl, $C_1$-$C_{10}$-fluoroalkyl, $C_2$-$C_{40}$-alkenyl, $C_6$-$C_{40}$-aryl, $C_6$-$C_{10}$-fluoroaryl, arylalkyl, arylalkenyl or alkylaryl having from 1 to 10, preferably from 1 to 4, carbon atoms in the alkyl radical and from 6 to 22, preferably from 6 to 10, carbon atoms in the aryl radical, a saturated heterocycle having from 2 to 40 carbon atoms or a $C_2$-$C_{40}$-heteroaromatic radical having at least one heteroatom selected from the group consisting of the elements O, N, S, P and Se, in particular O, N and S, with the heteroaromatic radical being able to be substituted by further radicals $R^3$ as defined above and a plurality of radicals $R^3$ being able to be identical or different. $R^2$ and $R^{2'}$ are preferably hydrogen.

T and T' are identical or different, preferably identical, and are each a divalent organic group which has from 1 to 40 carbon atoms and together with the cyclopentadienyl ring forms at least one further saturated or unsaturated, substituted or unsubstituted ring system having a ring size of from 5 to 12, in particular from 5 to 7, atoms, with T and T' within the ring system fused to the cyclopentadienyl ring being able to comprise the heteroatoms Si, Ge, N, P, As, Sb, O, S, Se or Te, preferably Si, N, O or S, in particular S or N.

Examples of preferred divalent organic groups T or T' are

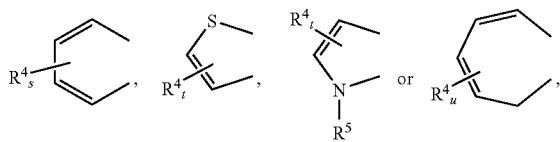

particularly preferably

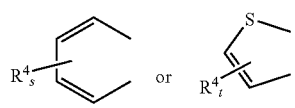

and in particular

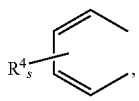

where the radicals $R^4$ are identical or different and are each an organic radical having from 1 to 40, preferably from 1 to 20, carbon atoms, for example a cyclic, branched or unbranched $C_1$-$C_{20}$-, preferably $C_1$-$C_8$-alkyl radical, a $C_2$-$C_{20}$-, preferably $C_2$-$C_8$-alkenyl radical, a $C_6$-$C_{22}$-, preferably $C_6$-$C_{10}$-aryl radical, an alkylaryl or arylalkyl radical having from 1 to 10, preferably from 1 to 4, carbon atoms in the alkyl radical and from 6 to 22, preferably from 6 to 10, carbon atoms in the aryl radical, with the radicals also being able to be halogenated, or the radicals $R^4$ are substituted or unsubstituted, saturated or unsaturated, in particular aromatic, heterocyclic radicals which have from 2 to 40, in particular from 4 to 20, carbon atoms and comprise at least one heteroatom, preferably selected from the group of elements consisting of O, N, S and P, in particular O, N and S, $R^5$ is hydrogen or has one of the meanings of $R^4$, or two adjacent radicals $R^4$ or $R^4$ and $R^5$ together with the atoms connecting them form a monocyclic or polycyclic, substituted or unsubstituted ring system which has from 3 to 40 carbon atoms and may also comprise heteroatoms selected from the group consisting of the elements Si, Ge, N, P, O, S, Se and Te, in particular N or S, the indices s are identical or different and are each a natural number from 0 to 4, in particular from 0 to 3, the indices t are identical or different and are each a natural number from 0 to 2, in particular 1 or 2, and the indices u are identical or different and are each a natural number from 0 to 6, in particular 1.

Z is a bridge between the two substituted cyclopentadienyl rings which consists of a divalent atom or a divalent group.

Examples of Z are:

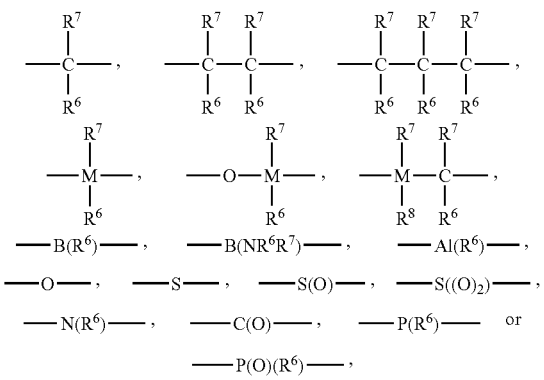

in particular

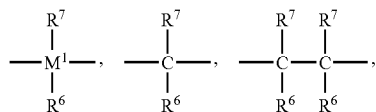

where $M^1$ is silicon, germanium or tin, preferably silicon or germanium, particularly preferably silicon, and $R^6$, $R^7$ and $R^8$ are identical or different and are each a hydrogen atom, a halogen atom, a trimethylsilyl group, a $C_1$-$C_{10}$-, preferably $C_1$-$C_3$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-, preferably $C_1$-$C_3$-alkoxy group, a $C_7$-$C_{15}$-alkylaryloxy group, a $C_2$-$C_{10}$-, preferably $C_2$-$C_4$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms.

Preferred embodiments of Z are the bridges dimethylsilanediyl, methylphenylsilanediyl, diphenylsilanediyl, methyl-tert-butylsilanediyl, dimethylgermanediyl, ethylidene, 1-methylethylidene, 1,1-dimethylethylidene, 1,2-dimethylethylidene, 1,1,2,2-tetramethylethylidene, dimethylmethylidene, phenylmethylmethylidene or diphenylmethylidene, in particular dimethylsilanediyl, diphenylsilanediyl and ethylidene.

Z is particularly preferably a substituted silylene group or a substituted or unsubstituted ethylene group, preferably a substituted silylene group such as dimethylsilanediyl, methylphenylsilanediyl, methyl-tert-butylsilanediyl or diphenylsilanediyl, in particular dimethylsilanediyl.

M is an element of group 3, 4, 5 or 6 of the Periodic Table of the Elements or the lanthanides, preferably an element of group 4 of the Periodic Table of the Elements, e.g. titanium, zirconium or hafnium, particularly preferably zirconium or hafnium, in particular zirconium.

The radicals X are identical or different, preferably identical, and are each an organic or inorganic radical, with two radicals X also being able to be joined to one another. In particular, X is halogen, for example fluorine, chlorine, bromine, iodine, preferably chlorine, hydrogen, $C_1$-$C_{20}$-, preferably $C_1$-$C_4$-alkyl, $C_2$-$C_{20}$-, preferably $C_2$-$C_4$-alkenyl, $C_6$-$C_{22}$-, preferably $C_6$-$C_{10}$-aryl, an alkylaryl or arylalkyl group having from 1 to 10, preferably from 1 to 4, carbon atoms in the alkyl radical and from 6 to 22, preferably from 6 to 10, carbon atoms in the aryl radical, —$OR^d$ or —$NR^dR^e$, preferably —$OR^d$ or —$NHR^d$, with two radicals X also being able to be joined to one another, preferably two radicals —$OR^d$ which are each, in particular, a substituted or unsubstituted 1,1'-bi-2-phenoxide radical. Two radicals X can also form a substituted or unsubstituted diene ligand, in particular a 1,3-diene ligand. The radicals $R^d$ and $R^e$ are each $C_1$-$C_{10}$-, preferably $C_1$-$C_4$-alkyl, $C_6$-$C_{15}$-, preferably $C_6$-$C_{10}$-aryl, alkylaryl, arylalkyl, fluoroalkyl or fluoroaryl each having from 1 to 10, preferably from 1 to 4, carbon atoms in the alkyl radical and from 6 to 22, preferably from 6 to 10, carbon atoms in the aryl radical and $R^e$ may also be hydrogen. X is very particularly preferably chlorine or methyl, in particular chlorine.

The index n is 0, 1, 2 or 3, with n+2 usually corresponding to the oxidation number of M, and in the case of the elements of group 4 of the Periodic Table of the Elements, n is usually preferably 2. When M is chromium, n is preferably 0 or 1, in particular 0.

Furthermore, the substituents are, for the purposes of the present invention, defined as follows, unless restricted further:

The term "organic radical having from 1 to 40 carbon atoms" as used in the present text refers to, for example, $C_1$-$C_{40}$-alkyl radicals, $C_1$-$C_{10}$-fluoroalkyl radicals, $C_1$-$C_{12}$-alkoxy radicals, saturated $C_3$-$C_{20}$-heterocyclic radicals, $C_6$-$C_{40}$-aryl radicals, $C_2$-$C_{40}$-heteroaromatic radicals, $C_6$-$C_{10}$-fluoroaryl radicals, $C_6$-$C_{10}$-aryloxy radicals, $C_3$-$C_{18}$-trialkylsilyl radicals, $C_2$-$C_{20}$-alkenyl radicals, $C_2$-$C_{20}$-alkynyl radicals, $C_7$-$C_{40}$-arylalkyl radicals or $C_8$-$C_{40}$-arylalkenyl radicals. An organic radical is in each case derived from an organic compound. Thus, the organic compound methanol can in principle give rise to three different organic radicals having one carbon atom, namely methyl ($H_3C$—), methoxy ($H_3C$—O—) and hydroxymethyl (HOC($H_2$)—).

The term "alkyl" as used in the present text encompasses linear or singly or multiply branched saturated hydrocarbons which may also be cyclic. Preference is given to $C_1$-$C_{18}$-alkyl such as methyl, ethyl, n-propyl, n-butyl, n-pentyl, n-hexyl, n-heptyl, n-octyl, n-nonyl, n-decyl, cyclopentyl, cyclohexyl, isopropyl, isobutyl, isopentyl, isohexyl, sec-butyl or tert-butyl.

The term "alkenyl" as used in the present text encompasses linear or singly or multiply branched hydrocarbons having one or more C—C double bonds which may be cumulated or alternating.

The term "saturated heterocyclic radical" as used in the present text refers to, for example, mono-cyclic or polycyclic, substituted or unsubstituted hydrocarbon radicals in which one or more carbon atoms, CH groups and/or $CH_2$ groups have been replaced by heteroatoms which are preferably selected from the group consisting of O, S, N and P. Preferred examples of substituted or unsubstituted saturated heterocyclic radicals are pyrrolidinyl, imidazolidinyl, pyrazolidinyl, piperidyl, piperazinyl, morpholinyl, tetrahydrofuranyl, tetrahydropyranyl, tetrahydrothiophenyl and the like, and also methyl-, ethyl-, propyl-, isopropyl- and/or tert-butyl-substituted derivatives thereof.

The term "aryl" as used in the present text refers to, for example, aromatic and if appropriate also fused polyaromatic hydrocarbon radicals which may optionally be monosubstituted or polysubstituted by linear or branched $C_1$-$C_{18}$-alkyl, $C_1$-$C_{18}$-alkoxy, $C_2$-$C_{10}$-alkenyl or halogen, in particular fluorine. Preferred examples of substituted and unsubstituted aryl radicals are, in particular, phenyl, pentafluorophenyl, 4-methylphenyl, 4-ethylphenyl, 4-n-propylphenyl, 4-isopropylphenyl, 4-tert-butylphenyl, 4-methoxyphenyl, 1-naphthyl, 9-anthryl, 9-phenanthryl, 3,5-dimethylphenyl, 3,5-di-tert-butylphenyl or 4-trifluoromethylphenyl.

The term "heteroaromatic radicals" as used in the present text refers to, for example, aromatic hydrocarbon radicals in which one or more carbon atoms have been replaced by nitrogen, phosphorus, oxygen or sulfur atoms or combinations thereof. These can, like the aryl radicals, optionally be monosubstituted or polysubstituted by linear or branched $C_1$-$C_{18}$-alkyl, $C_2$-$C_{10}$-alkenyl or halogen, in particular fluorine. Preferred examples are furyl, thienyl, pyrrolyl, pyridyl, pyrazolyl, imidazolyl, oxazolyl, thiazolyl, pyrimidinyl, pyrazinyl and the like, and also methyl-, ethyl-, propyl-, isopropyl- and/or tert-butyl-substituted derivatives thereof.

The term "arylalkyl" as used in the present text refers to, for example, aryl-comprising substituents whose aryl radical is linked via an alkyl chain to the remainder of the molecule. Preferred examples are benzyl, substituted benzyl, phenethyl, substituted phenethyl and the like.

The terms fluoroalkyl and fluoroaryl indicate that at least one hydrogen atom, preferably a plurality of hydrogen atoms and a maximum of all hydrogen atoms of the respective substituents has/have been replaced by fluorine atom(s). Examples of fluorine-comprising substituents which are preferred according to the invention are trifluoromethyl, 2,2,2-trifluoroethyl, pentafluorophenyl, 4-trifluoromethylphenyl, 4-perfluoro-tert-butylphenyl and the like.

The synthesis of the metallocene of the formula (I) is known in principle and can, for example, be carried out by methods analogous to those described in EP-A 574 597 or EP-A 704 454.

It is usual to react a suitable transition metal source, e.g. zirconium tetrachloride, with the desired ligands, e.g. two equivalents of cyclopentadienyl ligand in the form of its lithium salt. To synthesize ansa-metallocenes, i.e. metallocenes having a bridged biscyclopentadienyl ligand, the desired cyclopentadienyl radicals are firstly linked to one another and subsequently, usually after prior deprotonation, reacted with the transition metal source. WO 2001/48034 and WO 2003/045964 describe, for example, the syntheses of bridged biscyclopentadienyl metallocenes having two different cyclopentadienyl radicals.

Examples of suitable metallocene compounds are
dimethylsilanediylbis(indenyl)zirconium dichloride,
ethylenebis(indenyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride, diethylsilanediylbis(2-methylindenyl)zirconium dibromide,
dimethylsilanediylbis(2-ethylindenyl)zirconium dichloride,
dimethylsilanediylbis(2-methyl-4,5-benzindenyl)zirconium dichloride
dimethylsilanediylbis(2-ethyl-4,5-benzindenyl)zirconium dichloride
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-1-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)(2-methyl-4-phenylindenyl)zirconium dichloride,
dimethylsilanediyl(2-isopropyl-4-(1-naphthyl)indenyl)(2-methyl-4-(1-naphthyl)indenyl)zirconium dichloride,
dimethylsilanediyl(2-isopropyl-4-[4'-tert-butylphenyl]indenyl)(2-methyl-4-[4'-tert-butylphenyl]indenyl)zirconium dichloride,
dimethylsilanediyl(2-isopropyl-4-[4'-tert-butylphenyl]indenyl)(2-ethyl-4-[4'-tert-butylphenyl]indenyl)zirconium dichloride,
dimethylsilanediyl(2-isopropyl-4-[(4'-tert-butylphenyl]indenyl)(2-methyl-4-[3',5'-bis-tert-butylphenyl]indenyl)zirconium dichloride,
dimethylsilanediyl(2-isopropyl-4-[4'-tert-butylphenyl]indenyl)(2-methyl-4-[1'-naphthyl]indenyl)zirconium dichloride and
ethylene(2-isopropyl-4-[4'-tert-butylphenyl]indenyl)(2-methyl-4-[4'-tert-butylphenyl]indenyl)zirconium dichloride,
dimethylsilanediyl(2-ethyl-4-(4'-tert-butyl(phenyl)indenyl)(2-isopropyl-4-(4'-tert-butylphenyl)indenyl)zirconium dichloride,
dimethylsilanediyl(2-methyl-4-(4'-tert-butylphenyl)indenyl)-2-isopropyl-4-(1-naphthyl)indenyl)zirconium dichloride,
dimethylsilanediyl(2-methyl-4-phenyl)-1-indenyl)(2-isopropyl-4-(4'-tert-butylphenyl)-1-indenyl)zirconium dichloride,
dimethylsilanediyl(2-methylthiapentenyl)(2-isopropyl-4-(4'-tert-butylphenyl)indenyl)zirconium dichloride,
dimethylsilanediyl(2-isopropyl-4-(4'-tert-butylphenyl)indenyl)(2-methyl-4,5-benzoindenyl)zirconium dichloride,
dimethylsilanediyl(2-methyl-4-(4'-tert-butylphenyl)indenyl)(2-isopropyl-4-(4'-tert-butylphenyl)indenyl)zirconium dichloride,
dimethylsilanediyl(2-methyl-4-(4'-tert-butylphenyl)indenyl)(2-isopropyl-4-phenylindenyl)zirconium dichloride,
dimethylsilanediyl(2-ethyl-4-(4'-tert-butylphenyl)indenyl)(2-isopropyl-4-phenyl)indenyl)zirconium dichloride,
dimethylsilanediyl(2-isopropyl-4-(4'-tert-butylphenyl)indenyl)(2-methyl-4-(1-naphthyl)indenyl)zirconium dichloride,
dimethylsilanediylbis(2-methyl-4-(4'-tert-butylphenyl)tetrahydro-s-indacenyl)zirconium dichloride,
dimethylsilanediyl(2-methyl-4-phenyltetrahydro-s-indacenyl)(2-isopropyl-4-(4'-tert-butylphenyl)indenyl)zirconium dichloride or
dimethylsilanediyl(2-methyl-4-(4'-tert-butylphenyl)tetrahydro-s-indacenyl)(2-isopropyl-4-(4'-tert-butylphenyl)indenyl)zirconium dichloride or mixtures thereof, and also the corresponding dimethylzirconium, monochloromono(alkylaryloxy)zirconium and di-(alkylaryloxy)zirconium compounds.

It is also possible to use mixtures of various metallocene compounds or mixtures of metallocene compounds with other polymerization-active components of single-site catalyst systems as components of single-site catalyst systems. However, only one metallocene compound is used as compound comprising a transition metal in preferred single-site catalyst systems.

The single-site catalyst systems which are preferably used in the catalyst compositions of the invention, for example single-site catalyst systems based on metallocene compounds, generally further comprise cation-forming compounds as cocatalysts. Suitable cocatalysts are strong, uncharged Lewis acids, ionic compounds having Lewis-acid cations or ionic compounds having Brönsted acids as cations. Examples are tris(pentafluorophenyl)borane, tetrakis(pentafluorophenyl)borate and salts of N,N-dimethylanilinium.

Further compounds which are likewise suitable as cation-forming compounds and thus as cocatalysts are aluminoxane compounds. These are usually prepared by reaction of trialkylaluminum with water and are generally present as mixtures of both linear and cyclic chain molecules of differing lengths or cage molecules of differing sizes.

As compounds of the aluminoxane type, it is possible to use, for example, the compounds described in WO 00/31090. Particularly useful compounds are the compounds of the general formulae (II) and (III) which are frequently referred to in the literature as open-chain or cyclic aluminoxane compounds,

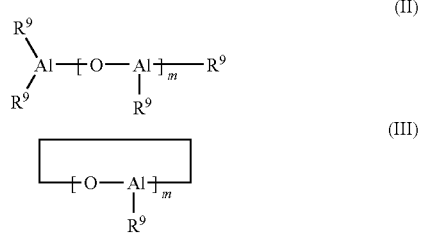

where the radicals $R^9$ can be identical or different and are each hydrogen or a $C_1$-$C_6$-alkyl group, preferably a methyl, ethyl or isobutyl or n-butyl group and in particular a methyl group, and m is an integer from 5 to 30, preferably from 10 to 25.

These oligomeric aluminoxane compounds are usually prepared by reacting alkylaluminum compounds with water. In general, the oligomeric aluminoxane compounds obtained here are in the form of mixtures of both linear and cyclic chain molecules of differing lengths, so that m is to be regarded as a mean. The aluminoxane compounds can also be present in admixture with other metal alkyls, preferably aluminum alkyls.

Furthermore, it is also possible to use modified aluminoxanes in which some of the hydrocarbon radicals or oxygen atoms have been replaced by alkyloxy, aryloxy, siloxy or amide radicals in place of the aluminoxane compounds of the general formulae (II) and (III).

The single-site catalyst systems which are preferably used in the catalyst compositions of the invention are preferably supported single-site catalyst systems in which the transition metal compounds acting as polymerization-active components of single-site catalyst systems have been applied to a solid. Suitable supports for preparing such catalyst solids are, for example, inert porous organic solids such as finely divided polymer powders or inert porous inorganic solids such as talc, a sheet silicate, or inorganic oxides, for example silica gel.

Inorganic oxides suitable as supports may be found in groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used either alone or in combination with the last-named oxidic supports are, for example, $ZrO_2$ or $B_2O_3$. Preferred oxides are silicon dioxide, particularly in the form of a silica gel or a pyrogenic silica, or aluminum oxide. A preferred mixed oxide is, for example, calcined hydrotalcite.

The support materials used preferably have a specific surface area determined by nitrogen adsorption in the range from 10 to 1000 m$^2$/g, preferably from 50 to 500 m$^2$/g and in particular from 200 to 400 m$^2$/g, and a pore volume determined by mercury porosimetry in the range from 0.1 to 5 ml/g, preferably from 0.5 to 3.5 ml/g and in particular from 0.8 to 3.0 ml/g. The mean particle size of the finely divided supports determined by Coulter-Counter analysis as volume-based average (median) is generally in the range from 1 to 500 μm, preferably from 5 to 350 μm and in particular from 10 to 100 μm.

The supports can also be subjected to a thermal treatment, e.g. to remove adsorbed water.

In addition, further starting materials such as organometallic compounds of metals of group 1, 2 or 13 of the Periodic Table, for example n-butyllithium or aluminum alkyls, or Lewis bases, for example amines, can also be added in the preparation of the catalyst solids of the supported single-site catalyst systems.

The catalyst compositions of the invention can also comprise a plurality of different compounds selected from among the above-described compounds comprising a transition metal.

The catalyst compositions comprising the pulverulent solids are suitable for the polymerization of olefins and especially for the polymerization of α-olefins, i.e. hydrocarbons having terminal double bonds. Suitable monomers can be functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and non-conjugated dienes such as 1,3-butadiene, 1,4-hexadiene or 1,7-octadiene or vinylaromatic compounds such as styrene or substituted styrene.

Suitable olefins also include those in which the double bond is part of a cyclic structure which can have one or more ring systems. Examples are cyclopentene, norbornene, tetracyclododecene and methylnorbornene and dienes such as 5-ethylidene-2-norbornene, norbornadiene and ethylnorbornadiene.

It is also possible to polymerize mixtures of two or more olefins.

In particular, the catalyst compositions can be used for the polymerization or copolymerization of ethylene or propylene. As comonomers in the polymerization of ethylene, preference is given to using $C_3$-$C_8$-α-olefins, in particular 1-butene, 1-pentene, 1-hexene and/or 1-octene. Preferred comonomers in the polymerization of propylene are ethylene and/or 1-butene.

The present invention further provides a process for the polymerization of olefins using catalyst compositions comprising the pulverulent solids of the invention. The polymerization can be carried out in a known manner in bulk, in suspension, in the gas phase or in a supercritical medium in the customary reactors used for the polymerization of olefins. It can be carried out batchwise or preferably continuously in one or more stages. Suspension processes, in particular in loop reactors and stirred tank reactors, or gas-phase processes, in particular stirred gas-phase processes, gas-phase fluidized-bed processes or polymerizations in multizone reactors, are all possible.

The polymerization can be carried out at temperatures in the range from −60 to 300° C. and pressures in the range from 0.05 to 300 MPa. Preference is given to temperatures in the range from 50 to 200° C., in particular from 60 to 100° C., and pressures in the range from 0.5 to 10 MPa, in particular from 1.5 to 7 MPa. The mean residence times are usually from 0.5 to 5 hours, preferably from 0.5 to 3 hours. Molar mass regulators, for example hydrogen, or customary additives such as antistatics can also be used in the polymerization.

The polymerization process of the invention can be a gas-phase polymerization. Here, stirred gas-phase processes, in particular those using stirred gas-phase reactors in which the pulverulent reaction bed is kept in motion by means of a vertical stirrer, are possible. Here, the reaction bed generally comprises the polymer which is polymerized in the respective reactor. The polymerization process of the invention is preferably carried out in a gas-phase fluidized-bed reactor in which the circulated reactor gas is fed in at the lower end of a reactor and is taken off again at its upper end. When the process is employed for the polymerization of α-olefins, the circulated reactor gas is usually a mixture of the α-olefin to be polymerized, if desired a molecular weight regulator such as hydrogen and inert gases such as nitrogen and/or lower alkanes such as ethane, propane, butane, pentane or hexane. Preference is given to using propane, optionally in combination with further lower alkanes. The velocity of the reactor gas has to be high enough to fluidize the mixed bed of finely particulate polymer which is present in the tube and serves as polymerization zone and also to effectively remove the heat of polymerization (noncondensed mode). The polymerization can also be carried out in the condensed or supercondensed mode, in which part of the circulating gas is cooled to below the dew point and recirculated as a two-phase mixture to the reactor in order to make additional use of the enthalpy of vaporization for cooling the reaction gas.

In gas-phase fluidized bed reactors, it is advisable to work at pressures of from 0.1 to 10 MPa, preferably from 0.5 to 8 MPa and in particular from 1.0 to 3 MPa. In addition, the cooling capacity depends on the temperature at which the (co)polymerization in the fluidized bed is carried out. It is advantageous to carry out the process at temperatures of from 30 to 160° C., particularly preferably from 65 to 125° C., with temperatures in the upper part of this range preferably being set for copolymers of relatively high density and temperatures in the lower part of this range preferably being set for copolymers of relatively low density.

Furthermore, a multizone reactor in which two polymerization zones are linked to one another and the polymer is passed alternately through these two zones a number of times, with the two zones also being able to have different polymerization conditions, can be used for a polymerization from the gas phase. Such a reactor is described, for example, in WO 97/04015 and WO 00/02929.

The polymerization process of the invention can also preferably be carried out as a suspension polymerization. Suspension media usually used are, for example, inert hydrocarbons such as isobutane or mixtures of hydrocarbons or else the monomers themselves. The suspension polymerization temperatures are usually in the range from −20 to 115° C. and the pressures are usually in the range from 0.1 to 10 MPa. The solids content of the suspension is generally in the range from 10 to 80% by weight. The suspension polymerization can be carried out either batchwise, e.g. in stirring autoclaves, or continuously, e.g. in tube reactors, preferably in loop reactors. In particular, the Phillips PF process as described in U.S. Pat. Nos. 3,242,150 and 3,248,179 can be employed.

The suspension polymerization is particularly preferably carried out in liquid propylene as suspension medium. Here, the polymerization is preferably carried out in one or more loop reactors arranged in the form of a cascade, and the suspension polymerization can be followed by a gas-phase polymerization, in particular in a gas-phase fluidized-bed reactor.

In a preferred embodiment of the suspension polymerization, a continuous prepolymerization of the catalyst is firstly carried out in a liquid medium in a loop reactor. As liquid medium, it is possible to use one or more liquid monomers. However, it is also possible to use any olefins serving as monomers in combination with an inert liquid hydrocarbon. This hydrocarbon can be either aromatic or aliphatic in nature. If a liquid hydrocarbon is used, its proportion is usually from 0.1 to 90% by weight, preferably from 10 to 50% by weight. The suspension medium of the suspension polymerization, in particular liquid propylene, is preferably used as liquid medium for the prepolymerization.

The pulverulent solids of the invention have the advantage that they make it possible in the polymerization of olefins in the presence of transition metal catalysts to prepare polyolefins which have a good property combination and in particular excellent film properties and are well suited to the production of fiber products with high catalyst productivity and without formation of agglomerates or deposits in the reactor. Furthermore, they also make it possible to minimize the influence of fluctuations in the compositions of the starting materials, in particular in respect of type and concentration of catalyst poisons, on the properties of catalysts and the properties of the polyolefins prepared therewith.

EXAMPLES

To characterize the samples, the following test was carried out:

Determination of the pressure rise in melt filtration to examine the melt filtration behavior:

The pressure rise in melt filtration was determined by extrusion of the polypropylene at 265° C. through a metal filter disk having a diameter of 30 mm and provided with a support mesh having a mesh opening of 5 μm at a throughput of 2 kg/h on a standard laboratory extruder (3-zone screw). The pressure rise was recorded as a function of time for 1 hour at a constant throughput.

Example 1 a) Preparation of the Catalyst Solid

In a Schlenk flask which had been made inert, 6.6 g o(Sylopol® 948, from Grace) which had been dried at 180° C. and a pressure of 100 Pa for 8 hours were suspended in 30 ml of purified toluene. 16.0 ml of a 4.75 M solution of methylaluminoxane (MAO) in toluene were subsequently added over a period of 30 minutes while stirring in such a way that an internal temperature of 15° C. was not exceeded. The mixture was subsequently stirred at 20° C. for two hours, the solid was filtered off, washed twice with 30 ml each time of toluene and dried in a stream of nitrogen until it was free-flowing.

The silica gel which had been pretreated with MAO in this way was suspended in 40 ml of dried toluene in a Schlenk flask which had been made inert. 190 mg of rac-dimethylsilanediylbis(2-methyl-4,5-benzoindenyl)zirconium dichloride were added to this suspension and the mixture was stirred at 20° C. for two hours. The catalyst was subsequently filtered off, washed twice with 30 ml of toluene and dried to constant weight under reduced pressure. This gave 9.7 g of a bright orange, free-flowing powder.

b) Immobilization of the Metal Alkyl on a Support 10 g of Aerosil® 380 (from Degussa) were dried at 150° C. and a pressure of 100 Pa for 8 hours and subsequently suspended in 360 ml of purified heptane, at 20° C. 15 ml of a 2 M solution of triisobutylaluminum in heptane were added dropwise to this suspension in such a way that an internal temperature of 25° C. was not exceeded. After stirring at 20° C. for two hours, the solid was filtered off, washed twice with 240 ml each time of heptane and subsequently dried to constant weight under reduced pressure. This gave 12 g of a white powder.

Elemental analysis: Si: 39.0% by weight; Al: 3.1% by weight c) Polymerization 3.5 g of the supported metal alkyl prepared in Example 1b) were placed in a dry 1 l reactor blanketed with nitrogen. 350 g of liquid propylene were introduced and 51 mg of the catalyst solid prepared in Example 1a) were subsequently added via a lock with the aid of nitrogen. The reaction mixture was heated to the polymerization temperature of 65° C. and polymerized for 1 hour. The polymerization was stopped by venting the remaining propylene and the product was drained off through a bottom valve. 179 g of a finely particulate polypropylene having an excellent morphology were obtained (productivity: 3500 g of PP/g of catalyst solid). Subsequent inspection of the reactor showed no deposits on the walls and stirrer.

Comparative Example A 2 ml of a 2 M solution of triisobutylaluminum in heptane (=4 mmol of triisobutylaluminum) were placed in a dry 1 l reactor blanketed with nitrogen. 350 g of liquid propylene were introduced and 39 mg of the catalyst solid prepared in Example 1a) were subsequently added via a lock with the aid of nitrogen. The reaction mixture was heated to the polymerization temperature of 65° C. and polymerized for 1 hour. The polymerization was stopped by venting the remaining propylene and the product was drained off through a bottom valve. 195 g of polypropylene powder were obtained (productivity: 5000 g of PP/g of catalyst solid). Subsequent inspection showed considerable deposits on the wall and stirrer of the reactor and also lumps in the polypropylene powder.

Comparative Example B

The procedure of comparative example A was repeated, but no solution of triisobutylaluminum in heptane was placed in the reactor at the beginning. No polymerization took place (productivity: 0 g of PP/g of catalyst solid).

Example 2 a) Preparation of the Catalyst Solid 3 kg of silica gel (Sylopol® 948, from Grace) were placed in a process filter and suspended in 15 l of toluene. While stirring, 7 l of a 30% strength by weight solution of MAO in toluene (from Albemarle) were introduced in such a way that an internal temperature of 35° C. was not exceeded. After stirring for a further hour at a low rotational speed, the suspension was filtered, firstly under atmospheric pressure and subsequently under a nitrogen gauge pressure of 0.3 MPa. A filter cake which comprised silica gel which had been treated with MAO and was moist with toluene was obtained. At the same time, 10 l of toluene, 2 l of the 30% strength by weight solution of MAO in toluene and 92.3 g of rac-dimethylsilanediylbis(2-methyl-4,5-benzoindenyl)zirconium dichloride were mixed in a second stirred vessel and stirred at room temperature for one hour. The solution obtained was added to the silica gel which had been pretreated with MAO in the process filter and the filter cake was thus covered with the solution. The outlet of the process filter was subsequently opened so that the metallocene/MAO solution could slowly penetrate into the filter cake. When no more liquid ran out from the process filter, the outlet was closed again, the filter cake was stirred for 15 minutes and left for one hour. The remaining solvent was subsequently pressed out of the filter cake by means of a nitrogen gauge pressure of 0.3 MPa, the filter cake was washed twice with 15 l each time of heptane and the solid was dried under reduced pressure until it was free-flowing.

The catalyst solid obtained was suspended in a mixture of white oil and Vaseline in a weight ratio of 80:20 so that a concentration of 200 g of catalyst per liter of oil/grease paste was obtained.

b) Immobilization of the Metal Alkyl on a Support

In a process filter, 20 kg of Aerosil® 380 (from Degussa) were suspended in 300 l of toluene. The suspension was heated to the boiling point. To remove the physisorbed water, 50 l of toluene were distilled off, another 50 l of toluene were introduced and 50 l of toluene were once again distilled off. The mixture was subsequently cooled to room temperature, filtered, the filter cake was washed twice with 350 l each time of heptane and then resuspended in 350 l of heptane. 28 kg of a 50% strength by weight solution of triisobutylaluminum in heptane were added to this suspension in such a way that an internal temperature of 30° C. was not exceeded. After stirring for another 2 hours, the suspension was filtered, the filter cake was washed twice with 350 l each time of heptane and the residual solvent was subsequently pressed out of the filter cake by means of a nitrogen gauge pressure of 0.2 MPa until no more liquid ran out. 32 kg of white oil were then added and the resulting suspension was drained into a drum.

The suspension obtained had a solids content of 125 g per kilogram of suspension.

c) Polymerization

The polymerization was carried out in a 1 m$^3$ loop reactor provided with an upstream polymerization reactor which was likewise configured as a loop reactor using liquid propylene as suspension medium. The polymerization was carried out at 70° C. and a pressure of 39 MPa. For the polymerization, 300 kg/h of propylene were continuously introduced into the loop reactor. The polymer obtained was discharged from the loop reactor, separated off from unreacted monomer and dried.

The solids were introduced into the prepolymerization reactor via a dilution vessel into which 250 ml per hour of the paste of catalyst solid in an oil/grease mixture prepared in Example 2a) and 5 kg per hour of liquid propane were continuously introduced. At the same time, 400 g per hour of the suspension prepared in Example 2b) were likewise introduced continuously into the dilution vessel. The mean residence time of the catalyst solid in the prepolymerization reactor (determined from the ratio of reactor volume to output) was 8 minutes. The suspension comprising the prepolymerized catalyst solid was then introduced continuously into the loop reactor. In the polymerization, propylene was obtained at an average productivity of 5500 g of PP/g of catalyst solid.

After an operating time of 5 days, the polymerization was stopped, the loop reactor and prepolymerization reactor were inspected and it was found that wall deposits were to be observed neither in the loop reactor nor in the prepolymerization reactor.

The examination of the melt filtration behavior indicated a pressure rise of 0.3 MPa per kg of PP.

Comparative Example C

Example 2 was repeated, but 210 ml per hour of the paste of catalyst solid in an oil/grease mixture prepared in Example 2a) were introduced continuously during the polymerization and 25 g per hour of triisobutylaluminum instead of the supported metal alkyl prepared in Example 2b) were introduced into the dilution vessel.

In the polymerization, polypropylene was obtained at an average productivity of 6500 g of PP/g of catalyst solid.

After an operating time of 5 days, the polymerization was stopped, the loop reactor and prepolymerization reactor were inspected and it was found that the walls of the reactor were covered with considerable deposits both in the loop reactor and in the prepolymerization reactor.

The examination of the melt filtration behavior indicated a pressure rise of 0.4 MPa per kg of PP.

Comparative Example D

Example 2 was repeated, but no metal alkyl, neither in supported form nor in liquid form, was introduced into the dilution vessel and 420 ml per hour of the paste of catalyst solid in an oil/grease mixture prepared in Example 2a) were continuously introduced.

In the polymerization, polypropylene was obtained at an average productivity of 3300 g of PP/g of catalyst solid.

After an operating time of 5 days, the polymerization was stopped, the loop reactor and prepolymerization reactor were inspected and it was found that wall deposits were to be observed neither in the loop reactor nor in the prepolymerization reactor.

The examination of the melt filtration behavior indicated a pressure rise of 0.8 MPa per kg of PP.

Comparison of Example 2 with comparative examples C and D shows that when the supported metal alkyls of the invention are used, it is possible to obtain a polypropylene having good properties in respect of the melt filterability without occurrence of deposits on the reactor walls and with approximately the same catalyst productivity achieved when using a metal alkyl solution. Moreover, when a metal alkyl solution is used, the considerable wall deposits would make long-term operation impossible.

The invention claimed is:

1. A pulverulent solid obtained by reacting a metal alkyl compound of a divalent or higher-valent metal and a finely divided support which on its surface bears functional groups which can form a chemical bond between the metal atom of the metal alkyl compound and the surface of the support, wherein the particles of the finely divided support have particle diameters of less than 1000 nm and less than 5% by weight of the metal alkyl compound is extractable in a single extraction of the pulverulent solid with 20 ml of heptane per gram of solid at 50° C.; and wherein the content of metal originating from the metal alkyl compound in the pulverulent solid is from 0.5 to 20% by weight.

2. The pulverulent solid of claim 1 wherein a pyrogenic silica is used as the support.

3. A process for preparing the pulverulent solid of claim 1 which comprises firstly drying the support to a water content of less than 3% by weight, then bringing the support which has been pretreated in this way into contact with the metal alkyl compound in an aliphatic or aromatic solvent, separating off the suspension medium by filtration and subsequently washing the solid at least once with an aliphatic or aromatic solvent.

4. The process of claim 3 wherein the support is dried by azeotropic distillation with a solvent which forms an azeotrope with water and does not react with the metal alkyl compound.

5. A catalyst composition for the polymerization of olefins, which comprises at least one compound comprising a transition metal and at least one pulverulent solid of claim 1.

6. The catalyst composition of claim 5 wherein the compound comprising a transition metal comprises a Phillips catalyst, a Ziegler-Natta catalyst, or a transition metal compound which acts as the polymerization-active component of an unsupported or a supported single-site catalyst system.

7. The catalyst composition of claim 6 wherein the polymerization-active component comprises a metallocene compound of the general formula (I),

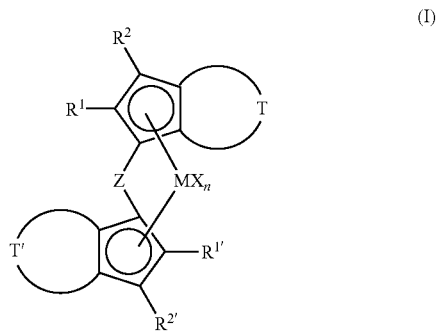

where
$R^1$, $R^{1'}$ are identical or different and are each an organic radical having from 1 to 40 carbon atoms,
$R^2$, $R^{2'}$ are identical or different and are each hydrogen or an organic radical having from 1 to 40 carbon atoms,
T, T' are identical or different and are each a divalent organic group which has from 1 to 40 carbon atoms and together with the cyclopentadienyl ring forms at least one further saturated or unsaturated, substituted or unsubstituted ring system having a ring size of from 5 to 12 atoms, with T and T' within the ring system fused to the cyclopentadienyl ring being able to comprise the heteroatoms Si, Ge, N, P, As, Sb, O, S, Se or Te,
Z is a bridge between the two substituted cyclopentadienyl ligands which consists of a divalent atom or a divalent group,
M is an element of group 3, 4, 5 or 6 of the Periodic Table of the Elements or the lanthanides,
the radicals X are identical or different and are each an organic or inorganic radical, with two radicals X also being able to be joined to one another, and
n is 0, 1, 2 or 3.

8. A process which comprises polymerizing an olefin at a temperature in the range from −60 to 300° C. and at a pressure in the range from 0.05 to 300 MPa, wherein the polymerization is carried out using the catalyst composition of claim 5.

9. The process of claim 8 wherein the polymerization is carried out as a suspension polymerization.

10. The process of claim 9 wherein the suspension polymerization is a polymerization using liquid propylene as a suspension medium.

* * * * *